United States Patent [19]
Smith

[11] 3,789,583
[45] Feb. 5, 1974

[54] WELL FLUID SEPARATION METHOD AND APPARATUS

[76] Inventor: James B. Smith, 2605 Fox St., Farmington, N. Mex. 87401

[22] Filed: May 7, 1969

[21] Appl. No.: 822,396

[52] U.S. Cl. ............................................... 55/171
[51] Int. Cl. ........................................... B01d 53/14
[58] Field of Search .................... 55/32, 171–177

[56] References Cited
UNITED STATES PATENTS
2,715,945   8/1955   Hankison et al. ...................... 55/32
3,094,574   6/1963   Glasgow et al. ....................... 55/32
3,119,674   1/1964   Glasgow et al. ....................... 55/32

Primary Examiner—Charles N. Hart
Attorney, Agent, or Firm—Brown & Martin

[57] ABSTRACT

An apparatus for separating liquids and gases in well fluids under pressure wherein the separated gas is passed through a chilled water absorber fluid that creates a temperature barrier to the inclusion of water vapor with the gas leaving the absorber fluid, by condensing the water vapor in the chilled absorber fluid.

4 Claims, 3 Drawing Figures

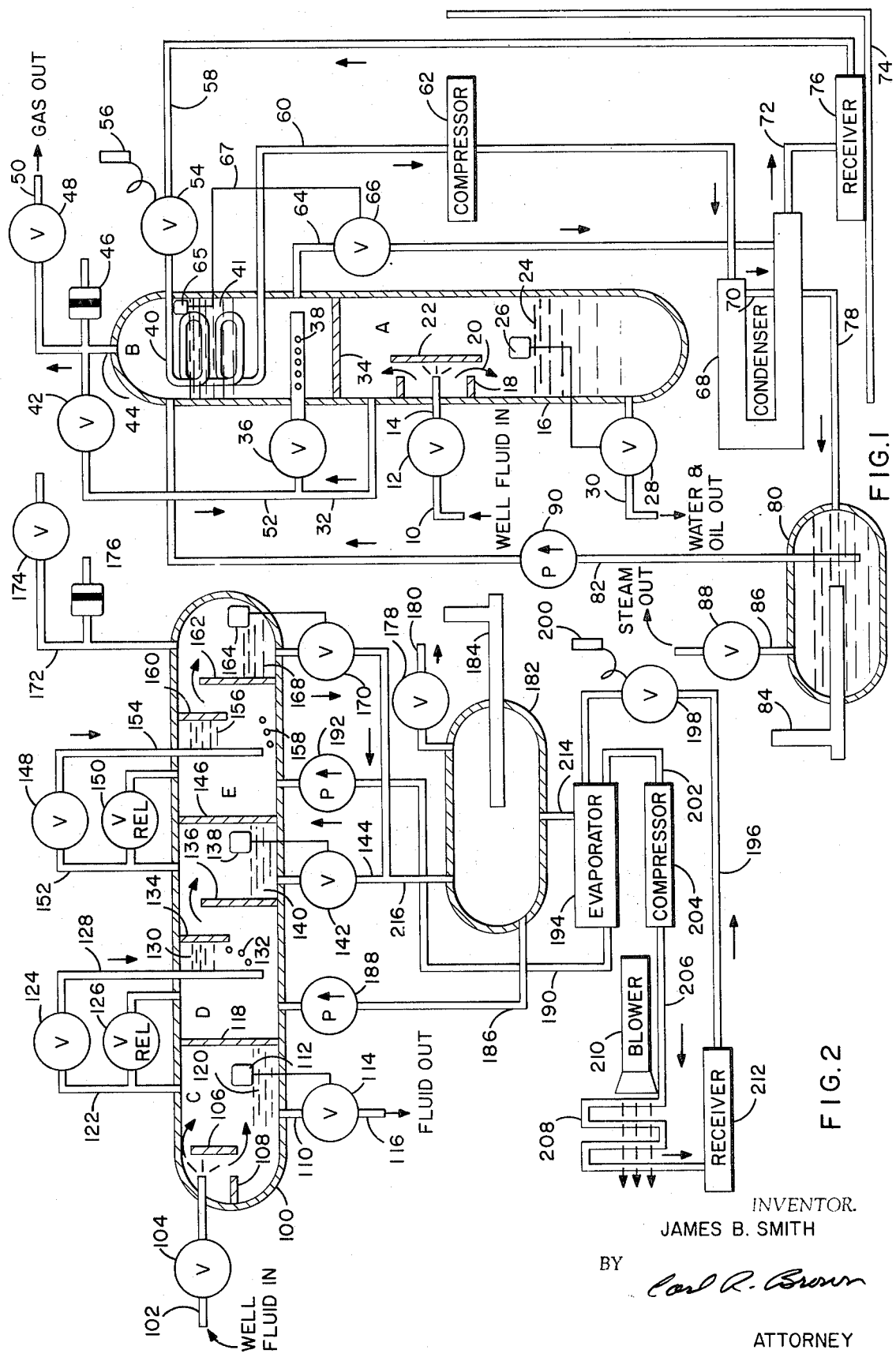

WELL FLUID SEPARATION METHOD AND APPARATUS

BACKGROUND OF THE INVENTION

The present invention relates to an apparatus for treating oil well fluids to remove gas from water and oil in the fluid and also to separate the oil and water. It is well known that oil well fluids from many producing wells have differing percentages of gas, oil, water and impurities therein. The fluids from such wells can be economically produced only where the gas or oil in the well fluids is of sufficient volume to justify the expense of pumping the well fluid from the well or collecting the well fluid from flowing wells, and effectively separating the oil or gas from the water and impurities. Many different processes have been used to separate the oil from the water. The most used processes employ gravity separation of these liquids. Also gravity separation is normally used to separate the gas from the liquids. However the separated gas often carries with it, water and other impurities, that seriously restricts the economic value of the separated gas.

Thus it is very advantageous to provide an apparatus for effectively and yet efficiently and economically removing water, water vapor and other impurities from gas separated from the well fluid as well as separating the remaining oil and water.

SUMMARY OF THE INVENTION

In the apparatus of this invention, the gas that may be present in well fluid under pressure is removed from the remaining oil and water in a first vessel under a first pressure condition. In this first vessel, the temperature and pressure are optimized to achieve maximum gravity separation of gas. However, the temperature and pressure is not such that water vapor and other impurities are completely removed from the separated gas. The gas is then fed to a second vessel or chamber where the gas is bubbled through a chilled absorber fluid that absorbs water. In this second vessel or chamber, the temperature and pressure is set to cool the water vapor sufficiently to condense the vapor to liquid form without condensing the gas. This creates a temperature barrier to the flow of water vapor with the gas through the chilled absorber liquid and thus the absorber liquid removes substantially all of the water vapor in the hydrocarbon gas as well as the liquid water that may be carried with the gas.

In the apparatus, the absorber liquid and the collected water is heated to a temperature sufficient to boil the water but not boil the absorber liquid. Thus the water is removed from the absorber liquid, which liquid is then returned to the second chamber where the absorber liquid is again cooled by a refrigeration cycle. Since the absorber liquid is heated to remove the water, in a modified form of the invention this heated absorber liquid is employed in an intermediate chamber. The gas is passed through the relatively hot absorber liquid in the intermediate chamber, which provides optimum conditions for removing other impurities in the gas.

My apparatus is such that it utilizes the heating and cooling of the absorber liquid, as well as the oil and water liquids, in the various refrigeration cycles to optimize heat and power utilization with a minimum of components.

It is therefore a principal object of the present invention to provide a new and improved well fluid separation apparatus that utilizes a temperature barrier condition to effectively remove water and water vapor from gas separated from the well fluid.

It is another object of the present invention to provide such a new and improved method and apparatus wherein the elements cooperate to effectively establish temperature controls by serving multiple functions.

Other objects and advantages of the present invention will be more apparent upon a reading of the following detailed description and an examination of the drawings wherein like reference numerals designate like parts throughout and in which:

FIG. 1 is a schematic diagram illustrating the well fluid separation method and apparatus used in the first embodiment of the present invention.

FIG. 2 is a schematic diagram illustrating the well fluid separation method and apparatus used in the second embodiment of the present invention.

Figure 3:
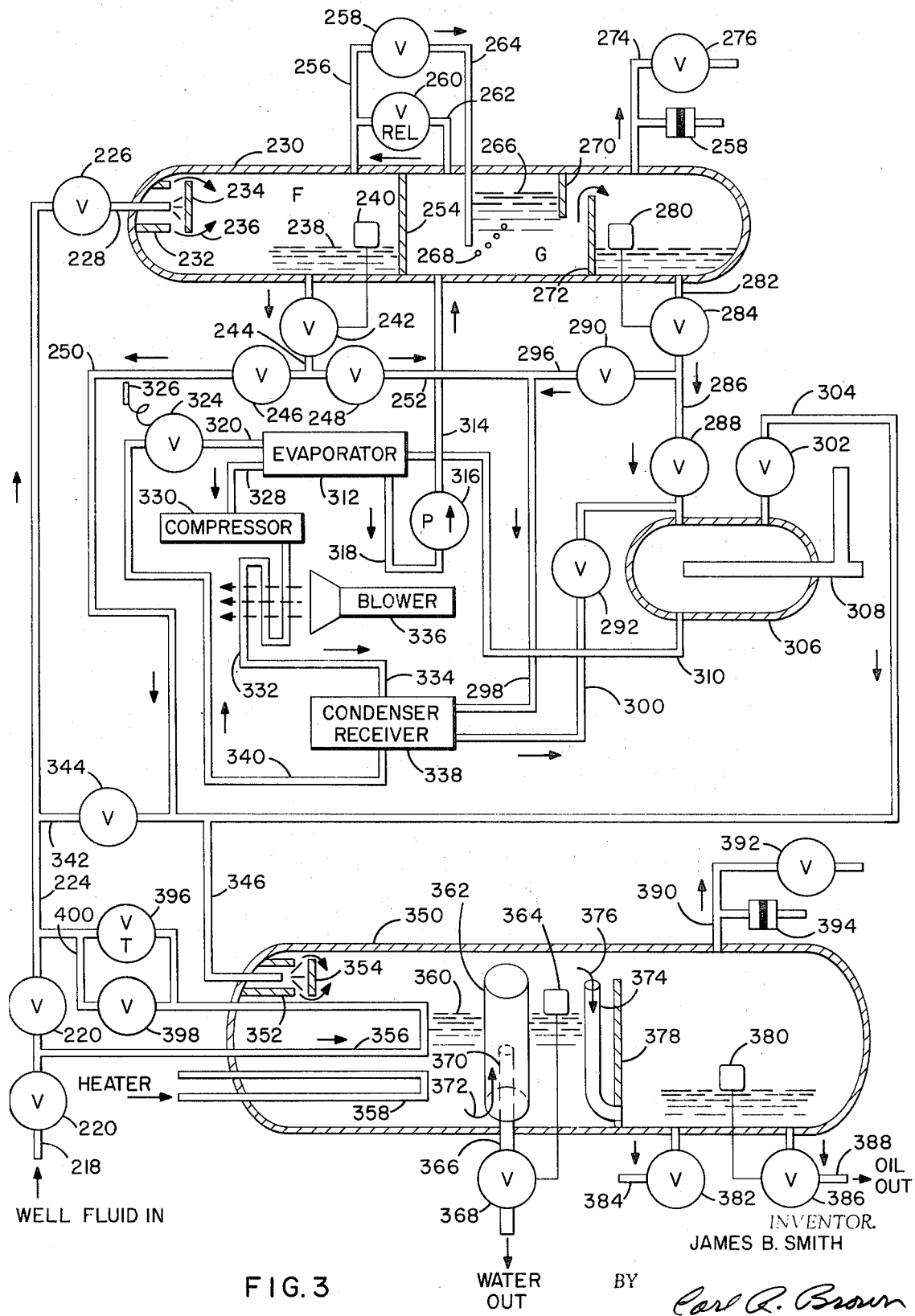
FIG. 3 is a schematic diagram illustrating the well fluid separation method and apparatus used in the third embodiment of the present invention.

The embodiments of FIGS. 1 and 2 are used with wells in which the well liquid separated from the gas has such a low amount of oil or such a large amount of water that it has little value for separation. Thus only the gas is separated. The embodiment of FIG. 3 is adapted for use with a well of substantially any value and separates gas, oil, and water into separate components. The apparatus of FIGS. 1 and 2 may be utilized in the apparatus shown in FIG. 3, if desired.

In FIG. 1, one vessel 16 in vertical position is separated by wall 34 into two compartments A and B for separating gas from the well fluid. It is to be understood that two separate vessels can also be used. Also the single vessel 16 or the two vessels can be placed in either a horizontal or a vertical position. The entire apparatus of FIG. 1 is mounted on a skid 74, that provides a walled enclosure that acts as a windbreak to prevent freezing of the well fluid within the unit or prevents sluggish flow of the liquids in the system. The skid 74 also functions as a means for moving the equipment from well to well or to selective positions for use. The skid 74 can also be used to move the equipment of the embodiments of FIGS. 2 and 3. In the separator vessel 16, chamber A is gravity separator for separating the gas from the well liquid and chamber B is an absorber separator for removing water and water vapor from the separated gas.

The well fluid is supplied under natural pressure through line 10, with the fluid flow being controlled by valve 12. The fluid exists from line 14 and impinges against plate 22 positioned between plates 18 in chamber A. The abrupt change of direction of the fluid impinging on plate 22 allows the liquid in the well fluid to drop down in the direction of arrow 20 to the liquid 24 in chamber A. Float-controlled valve 28 and 26 controls the draining of accummulated liquid through output line 30 when the liquid 24 exceeds a predetermined level. The gas in the well fluid, being lighter than the liquid, rises in the direction of the arrow to the top of chamber A and passes through line 32, valve 36 and pipe 38 into the lower part of chamber B. The gas bubbles up into the absorber liquid 41 in chamber B. The absorber liquid 41 is selected for its affinity for water and has a boiling point well above that of water. Glycol is an example of a satisfactory absorber liquid. Water and water vapor in the gas is absorbed by the absorber liquid 41 as the well gas rises through the absorber liquid. The gas bubbles rise above the upper level of the absorber liquid 41 and passes through line 44 to outlet valve 48, through which the gas discharges for productive use elsewhere. A safety valve 46 is positioned in line 44 and includes a rupture head that will rupture when a preselected pressure is exceeded. A by-pass valve 42 is positioned in line 52 which interconnects line 32 with line 44. This valve 42 permits a desired pressure relationship to be maintained between chamber A and chamber B without passing absorber liquid from chamber B into chamber A.

As previously described, chamber A is a gravity separator and chamber B is an absorber type water separator. In the operation of each chamber, the temperature of the environment determines efficiency. However, where the temperature barrier is used in the absorber chamber, it is not necessary for the gravity separator to remove all the water from the gas separated from the well fluid and the water retained in the gas is absorbed by the absorber liquid. In the construction shown in FIG. 1, no attempt is made to control the temperature in gravity separator A. However, absorber separator B is chilled by evaporator coil 40 that extends therein in the absorber liquid 41. This creates a temperature barrier to retaining water in the gas, as the water in vapor form condenses and is removed by the absorber liquid. Evaporator coil 40 is connected to line 60 that carries cooling gas to compressor 62 and from the compressor 62 to condenser 68. The cooling gas condenses in condenser 68 and flows through line 72 to the receiver 76 where the fluid flows or is pumped in a normal refrigeration cycle to the evaporator coils 40. Valve 54 and temperature control device 56, that is normally positioned in the absorber liquid 41, controls the expansion of the refrigerating gas to maintain a given temperature of the absorber liquid 41.

Float controlled valve 65 maintains the liquid level of the absorber liquid 41 in chamber B at a pre-selected height as absorber liquid 41, containing absorbed water, is removed. Valve 66 is located in line 64 which communicates with condenser 68. The cold absorber liquid flows through the condenser, removing heat from the refrigeration fluid and then is carried by line 78 to reboiler 80. Compressor 62 compresses the refrigerant in the refrigerator system into the condenser 12. While the temperature control 56 regulates valve 54, it may control the compressor 62 instead, or it may be used to control both the valve 54 and the compressor 62. The reboiler 80 employs a burner type heater 84 that heats the absorber liquid to a temperature where the absorbed water boils off as steam through line 86 and valve 88 into the atmosphere. Pump 90 draws the absorber liquid through line 82 into separator chamber B completing the cycle of the absorber liquid 41. The absorber liquid 41 in chamber B is a secondary refrigerant which cools the well fluid entering the chamber B through line 38. It removes both heat and water from the well fluid as they contact in chamber B. The cooled absorber liquid 41 then removes heat from the refrigerant in condenser 68, and gives up retained water as steam in the reboiler 80.

There are three fluids in the system: the well fluid, the refrigerant, and the absorber liquid. Direct contact is made between only two, the gas from the well fluid and the absorber liquid. This occurs in chamber B. The well fluid enter separator A and some water is removed by gravity. The separated gas then passes through valve 36 into chamber B where contact with the absorber liquid 41 is made and where the absorber liquid 41 retains the water as it leaves chamber B through line 64. The refrigerant in the refrigeration cycle expands into vapor inside coil 40 in chamber B, and removes the heat from the absorber liquid 41. Compressor 62 forces the refrigerant into the receiver as a liquid after heat exchange in the condenser 68. The absorber liquid functions as coolant in the heat exchanger 68 and passes to the reboiler 88. Pump 90 continues flow of the absorber liquid back to absorber separator chamber B. The method and apparatus described is simple and is desirable for use where the well fluid pressure is not too great for expansion coil 40, and where the well fluid does not contain a large amount of oil.

In the embodiment of FIG. 2, a hot absorber liquid separator chamber is interposed between the gravity separator chamber and the cool absorber liquid separator chamber. This permits removal of foreign materials with heat and prevents congestion in the system by clogging or hardening of the well fluid materials. The well fluid is introduced into the system through line 102 and valve 104 that communicates with separation vessel 100. The well fluid impinges against plate 106 and liquids in the well fluid passes over the end of plate 108 and falls to the bottom of gravity separator chamber C. The liquids 120 are removed through drain line 110 and 116 that is controlled by the float controlled valve 112 and 114. The separation chambers C, D, and E are shown in one vessel 100 for convenience and the vessel is also illustrated in a horizontal position. It is to be understood that individual vessels can be used for each separator chamber and the vessel or vessels can be arranged in any position.

The gas separates from the well fluid and passes from gravity separator chamber C through line 122 and valve 124 to the bottom of the hot absorber separation chamber D, which chamber is separated from chamber C by wall 118. Chamber D contains a heated absorber liquid 130. A pressure by-pass valve 126 maintains the desired pressure relationship between chambers C and D without passing absorber liquid 130 from chamber D back to chamber C. The hot absorber liquid 130 absorbs water and impurities from the gas 132. The gas and absorber liquid flows between baffles 134 and 136, with the gas passing through line 152 and valve 148 into the cold absorber chamber E near the bottom thereof. Wall 146 separates chambers D and E. A cold absorber liquid 156 is disposed in the chamber E. The gaseous well fluid 158 bubbles up through the cold absorber liquid 156 and passes between baffles 160 and 162 and through line 172 and valve 174. A safety valve 176 is positioned in line 172 and includes a rupture head that will rupture and reduce the pressure in the system when the pressure reaches a predetermined value. A pressure control valve 150 is positioned in line 152 to control the pressure between chambers D and E without passing absorber fluid between the chambers. Float controlled valves 138, 142, 164 and 170 pass hot absorber liquid 130 and cold absorber liquid 156 through lines 144 and 216 to reboiler 182. Firetube heater 184 boils off steam from the absorber liquids and the steam is removed through line 180 and valve 178. The resultant hot absorber liquid in reboiler 182 is drawn through line 186 by pump 188 and is forced into the hot absorber separator chamber D. A new supply of cold absorber liquid is transmitted to cold absorber separator chamber E by pump 192 through line 190 from a chilled refrigerator, evaporator 194. In the refrigeration cycle between receiver 212 and the refrigeration-evaporator 194, compressor 204 forces refrigerant vapor into coil 208 that is cooled by a cooling means, such as the fan or blower 210. The refrigerant is condensed and collects in the receiver 212, from which it flows to the evaporator 194 through line 196. A temperature sensing device 200, that is normally positioned in the refrigerator-evaporator 194, controls the flow of refrigerant through valve 198 and thus the temperature in the evaporator 194. The cold absorber liquid from valve 170 may be used to cool the condenser coils 208 through a heat exchanger unit if desired.

In a third embodiment of the invention, see FIG. 3, a method and apparatus is employed in which water is removed from the oil in the well fluid through the addition of heat. The well fluid passes through line 218 and through valve 220 into heat exchange coil 356, where it is heated in the water-oil liquid 360 by known heater coil 358. The heated well fluid passes out line 356 through valve 398 and line 224 to valve 226 and then into gravity separator chamber F in vessel 230 through line 228. The heated well fluid impinges against plate 234 between side baffles 232 and the liquid 238 drops in the direction of arrow 236 to the bottom of the chamber F. The gaseous well fluid passes through line 256 and valve 258 into the bottom of cold absorber liquid chamber G. Pressure by-pass valve 260 maintains a desired pressure relationship between chambers F and G without passing absorber liquid between the chambers. The gaseous well fluid 268 bubbles up through the cold absorber liquid 266, which is held at a given level by baffles 270 and 272. Water is removed from the gas in the absorber liquid 266 and dry gas is released from the first pressure phase vessel 230, by valve 276. Separator chamber F may be maintained at a controlled temperature, such as near 39 degrees F. for example, or at a much higher temperature depending upon requirements.

The first pressure phase occurs in vessel 230. The second pressure phase occurs in vessel 350. As previously stated, the chamber in vessel 350 is heated by a known heating coil 358. This coil may be a known burner firetube or it may pass circulated hot liquid supplied from any suitable known source (not shown). Liquid from the system is fed to vessel 350 from lines 250, 304 and 346 through control valves 246 and 302 and impinges against plate 354. The liquid drops beyond baffles 352 to the bottom of the chamber and the gas that still may be in the fluid continues through vessel 350 to the outlet line 390 and valve 392. A safety valve 394 is connected to line 390 and will actuate when a predetermined pressure is exceeded. The liquid 360 rises in vessel 350 and the oil (top layer) overflows in the direction of arrow 376 into pipe 374 and passes through the partial partition 378. The level controlled valve 380 and 386 and line 388 removes the oil as desired. Line 384 and valve 382 function as a drain.

A second pipe 362 rises above the liquid level in the chamber and extends short of the top of vessel 350. The lower end of this pipe extends below the water level and is spaced from the bottom of vessel 350. Thus, water can enter pipe 362 in the direction of arrow 372 but oil cannot due to the fact that the oil separates from the water at the top of the volume of liquid 360. A pipe 370 is disposed within pipe 362 and provides a water outlet. Float control valve 364 and 368 and line 366 removes the water while maintaining water and oil separation. Heater coil 358 maintains a temperature that is best suited to remove water from oil or to gain the desired liquid separation. A choke 396 may be used in high pressure operation. Volume control valve 398 and by-pass valve 222 may be employed to reduce the temperature of well fluid flowing into line 224 by passing unheated well fluid directly into line 224. By-pass line 342 and valve 344 allow well fluid to be fed directly into vessel 350, as for example, when the well fluid has very little gas or to initially charge the system.

In normal operation, chamber F is held at about 39 degrees F. If desired, heat may be provided to chamber F to remove foreign materials that requires heat to separate. Absorber separator chamber G is operated at a cold temperature. The absorber liquid circulates through float controlled valve 284 into line 286 and through valve 288 into reboiler 306. The absorber liquid is heated in reboiler 306 by firetube heater 308 and the water in the absorber liquid passes off through valve 302 and line 304 in the form of steam. The heated absorber liquid then flows out line 310 to the evaporator or refrigeration cooler that cools the absorber liquid to the desired cold temperature. The cold absorber liquid is then pumped by pump 316 through line 314 into chamber G. In an alternative cycle, the absorber liquid circulates through line 286 and open valve 290 (valve 288 is closed) to lines 296 and 298, and through the condenser-receiver 338. The cold absorber fluid functions as a coolant in condenser 338 and then flows through line 300 and open valve 292 to the reboiler 306, where the water is boiled off as steam. Additionally, the well fluid 238 in chamber F can, if necessary, be used in the condenser-receiver 338 as a coolant. In this mode valve 248 is opened allowing the well fluid to flow through lines 252 and 298 in the manner previously described. As previously stated, the fluid in reboiler 306, other than the absorber fluid, passes to chamber 350 through line 304.

The refrigeration cycle for cooling the evaporator 312 comprises a compressor 330 that compresses refrigeration gas received from the evaporator 312 through line 328. The compressor 330 compresses the refrigeration gas, which is cooled in coils 332 by blower 336, and the gas is condensed in the condenser-receiver 338 and is returned through line 340 to expansion valve 324. Expansion valve 324 is controlled by temperature control 326 that is normally positioned in the evaporator 312, to assure correct temperature cooling of the absorber liquid to compartment G.

Having described my invention, I now claim:

1. Apparatus for achieving fluid separation in oil well fluid including, gravity separator means for receiving well fluids and substantially separating gas from the liquid of the well fluid, an absorber separator means for receiving said gas and absorbing water liquid and vapor from said gas, said absorber separator means having a water absorber liquid cooled to a temperature range that forms a temperature barrier that restrains water vapors from forming in the gas that is passed through said absorber liquid, means for cooling said absorber liquid to a temperature in said absorber separator means that is below the condensation temperature of water vapor and above the condensation temperature of said gas, and a second absorber separator means positioned between said gravity separator means and said absorber separator means and having heated absorber liquid for removing impurities amenable to separation under heat from said gas passing therethrough from said gravity separator means to said absorber separator means.

2. Apparatus as claimed in claim 1 including, a second gravity separator means for receiving liquid of the well fluid from said gravity separator means and separating oil from water in said liquid, means for heating said second gravity separator means, and means for passing said well fluids through said heated second gravity separator means prior to insertion into said gravity separation means.

3. Apparatus for achieving fluid separation in oil well fluid including, gravity separator means for receiving well fluids and substantially separating gas from the liquid of the well fluid, an absorber separator means for receiving said gas and absorbing water liquid and vapor from said gas, and said absorber separator means having a water absorber liquid cooled to a temperature range that forms a temperature barrier that restrains water vapors from forming in the gas that is passed through said absorber liquid, means for cooling said absorber liquid to a temperature in said absorber separator means that is below the condensation temperature of water vapor and above the condensation temperature of said gas, means for cooling said absorber liquid having a refrigeration cycle including an evaporator, a condenser and a refrigerant therein, control means for passing said cooled absorber liquid from said absorber separator means through said condenser, reboiler means for receiving said absorber liquid from said condenser and heating said absorber liquid to a temperature above the boiling temperature of water, and said evaporator cools said heated absorber liquid from said reboiler means for said absorber separator means.

4. Apparatus as claimed in claim 3 including, a second absorber separator means positioned between said gravity separator means and said absorber separator means and having heated absorber liquid for removing impurities amenable to separation under heat from said gas passing therethrough from said gravity separator means to said absorber separator means, and means for passing heated absorber liquid from said reboiler means to said second absorber separator means.

* * * * *